United States Patent
Greiner et al.

(10) Patent No.: US 11,390,718 B2
(45) Date of Patent: Jul. 19, 2022

(54) ELASTIC PARYLENE

(71) Applicant: SPECIALTY COATING SYSTEMS, INC., Indianapolis, IN (US)

(72) Inventors: Andreas Greiner, Amoneburg (DE); Tobias Moss, Koblenz (DE); Rakesh Kumar, Indianapolis, IN (US)

(73) Assignee: SPECIALTY COATING SYSTEMS, INC., Indianapolis, IN (US)

(*) Notice: Subject to any disclaimer, the term of this patent is extended or adjusted under 35 U.S.C. 154(b) by 409 days.

(21) Appl. No.: 16/380,642

(22) Filed: Apr. 10, 2019

(65) Prior Publication Data

US 2020/0325288 A1    Oct. 15, 2020

(51) Int. Cl.
*C08J 5/18* (2006.01)
*B05D 1/00* (2006.01)
*B05D 3/06* (2006.01)

(52) U.S. Cl.
CPC .......... *C08J 5/18* (2013.01); *B05D 1/60* (2013.01); *B05D 3/067* (2013.01); *B05D 2518/00* (2013.01); *C08J 2365/04* (2013.01)

(58) Field of Classification Search
CPC ........ C08J 5/18; C08J 5/2231; C08J 2365/04; B05D 1/60; B05D 3/067; B05D 2518/00
See application file for complete search history.

(56) References Cited

U.S. PATENT DOCUMENTS

| | | | |
|---|---|---|---|
| 6,086,952 A | 7/2000 | Lang et al. | |
| 6,140,456 A | 10/2000 | Lee et al. | |
| 6,495,208 B1 | 12/2002 | Desu et al. | |
| 2002/0120083 A1 | 8/2002 | Lee | |
| 2015/0017342 A1 | 1/2015 | Carver et al. | |

FOREIGN PATENT DOCUMENTS

WO    2019023166 A1    1/2019

OTHER PUBLICATIONS

Jay J. Senkevich, Benjamin W. Woods, J. Jay McMahon, and Pei-I Wang. "Thermomechanical Properties of Parylene X, A Room-Temperature Chemical Vapor Depositable Crosslinkable Polymer". Chem. Vap. Deposition 2007, 13, 55-59 (Year: 2007).*
Beach, W.F. (2004). Xylylene Polymers. In Encyclopedia of Polymer Science and Technology, (Ed.). https://doi.org/10.1002/0471440264.pst405 (Year: 2004).*
Judd, Mike Brindley, Keith. (1999). Soldering in Electronics Assembly (2nd Edition)—1.2.2 Printed Circuit Board Base Materials. Elsevier. Retrieved from https://app.knovel.com/hotlink/pdf/id:kt008S4TTH/soldering-in-electronics/printed-circuit-board-base (Year: 1999).*
Brad P. Carrow, Rex E. Murray, Benjamin W. Woods, and Jay J. Senkevich. "Poly(ethynyl-p-xylylene), An Advanced Molecular Caulk CVD Polymer". Mater. Res. Soc. Symp. Proc. vol. 863 © 2005 Materials Research Society. B2.10.1-6 (Year: 2005).*

* cited by examiner

*Primary Examiner* — Michael M Dollinger
*Assistant Examiner* — Christina H. W. Rosebach
(74) *Attorney, Agent, or Firm* — Lando & Anastasi, LLP

(57) ABSTRACT

Elastic Parylene films produced via chemical vapor deposition polymerization (CVDP) on a substrate are disclosed.

10 Claims, 2 Drawing Sheets

ELASTIC PARYLENE

FIELD OF THE INVENTION

Aspects relate generally to Parylene films and, more particularly, to elastic Parylene films for use as coatings on flexible substrates and methods for their deposition.

BACKGROUND

Poly(para-xylylene) (PPX) (tradename Parylene) is a polymer with commercial use as a coating material. PPX offers a unique set of properties pertaining to biocompatibility, insolubility, high temperature stability, extraordinary electrical insulation, and barrier properties which are of interest for practical applications in connection with medical devices, electronics, MEMS, artifact conservation, and barrier coatings.

PPX may be produced by chemical vapor deposition polymerization (CVDP) resulting in conformal, pinhole free films. Precursor [2,2]paracyclophane is generally vaporized at a reduced pressure and then pyrolyzed at elevated temperatures to corresponding 1,4-quinodiemethanes, the actual monomer, which condensates on substrates below 30° C. and polymerizes spontaneously with simultaneous formation of PPX films. The films can be stretched to a certain extent depending on the particular PPX composition without breaking but they are not elastic which is required for use in connection with flexible substrates. This lack of elasticity may result in delamination and/or breakage of the PPX coating.

SUMMARY

In accordance with one or more aspects, a chemically cross-linked elastic Parylene or poly(para-xylylene) (PPX) polymer film is disclosed.

In accordance with one or more aspects, a method of preparing a chemically cross-linked elastic Parylene or poly(para-xylylene) (PPX) polymer film is disclosed. The method may comprise mixing a substituted paracyclophane and a vinyl-functionalized paracyclophane to form a mixture, and co-polymerizing the mixture via a chemical vapor deposition polymerization (CVDP) process on a substrate to form the chemically cross-linked elastic polymer film.

In accordance with one or more aspects, a chemically cross-linked elastic Parylene or poly(para-xylylene) (PPX) polymer film is prepared by any of the methods disclosed herein.

In accordance with one or more aspects, a device comprising a flexible substrate is disclosed. The flexible substrate is coated with any of the Parylene polymer films disclosed herein.

Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures.

DETAILED DESCRIPTION

Figure 1:
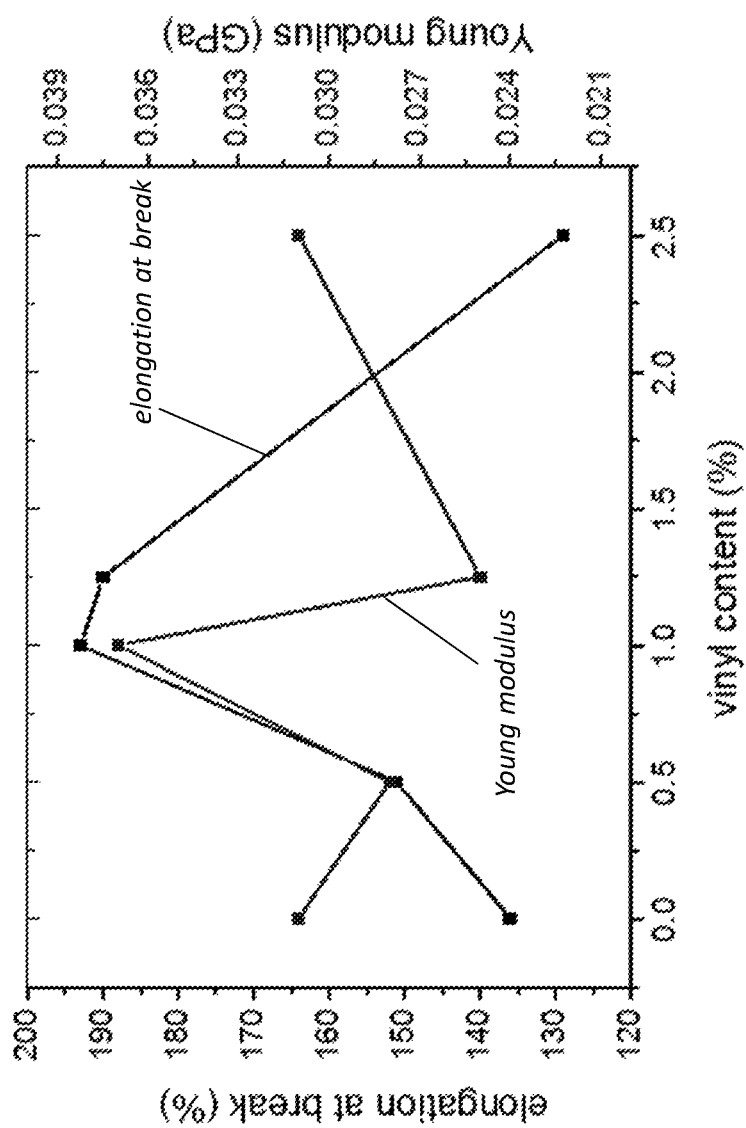
FIGS. 1 and 2 present data discussed in the accompanying Example.

In accordance with one or more embodiments, an elastic Parylene or PPX coating is disclosed. In accordance with various embodiments, elastic Parylene or PPX coatings may be produced via chemical vapor deposition polymerization (CVDP).

Imparting elasticity generally involves softening of a solid polymer below use temperature, in combination with cross-linking of individual macromolecules. Production of PPX via CVDP, however, typically involves reagents passing a pyrolysis zone at about 500° C. to about 700° C. which degrades functional groups commonly used for cross-linking.

In accordance with one or more embodiments, an elastic Parylene coating may generally be made of any member of the generic Parylene polymer series, or a variation thereof. Choice of a Parylene polymer may largely be based on desired properties in view of an intended application.

In accordance with one or more embodiments, a mixture of a substituted para-cyclophane and a paracyclophane with reactive and/or cross-linkable groups, e.g. vinyl or ethinyl, may be used to produce an elastic PPX film via CVDP.

In accordance with one or more embodiments, a mixture of a substituted para-cyclophane and vinyl-paracyclophane may be used to produce an elastic PPX film via CVDP. The amount of vinyl paracyclophane may be considered critical with respect to the extent of resulting elasticity. Too much vinyl para-cyclophane may result in a brittle coating while too little may not result in cross-linking.

In accordance with one or more embodiments, a method of preparing a chemically cross-linked PPX polymer film may comprise mixing a substituted paracyclophane and a vinyl-functionalized paracyclophane to form a mixture. The mixture may be co-polymerized via a chemical vapor deposition polymerization (CVDP) process on a substrate to form the chemically cross-linked PPX polymer film. The substituted paracyclophane and vinyl-functionalized paracyclophane may generally be mixed before or during the CVDP process.

In accordance with one or more embodiments, an optimized weight fraction of vinyl paracyclophane relative to the other paracyclophane may result in optimized elasticity of the PPX films.

In some embodiments, the substituted paracyclophane may have a low glass transition temperature. In some specific embodiments, the substituted paracyclophane may be a dialkyl functionalized paracyclophane, e.g. a dibutyl functionalized paracyclophane. In some particular non-limited embodiments, the substituted paracyclophane is 4,12-dibutyl[2,2]paracyclophane. Other paracyclophanes, e.g., those with lateral, linear, or branched alkyl chains, e.g. with 2, 3, 5, or 6 carbon atoms, may be used. In some embodiments, monosubstituted paracyclophanes may be used.

In some specific non-limiting embodiments, the vinyl-functionalized paracyclophane may be 4-vinyl[2.2]paracyclophane. The ratio of the vinyl-paracyclophane to the substituted paracyclophane may be about between about 1:500 and 1:10, preferably between about 1:200 and 1:100.

Various isomers or mixtures thereof with regard to the various substituents may be used.

In accordance with one or more embodiments, cross-linking may be a physical or chemical process. Cross-linking may result from intermolecular reaction of reactive groups of the macromolecules as initiated by an external stimulus, i.e. heat, irradiation, light, e.g. UV light, or plasma. In some embodiments, an additional initiator may be implemented.

In at least some embodiments, the PPX polymer films may be produced in a Parylene deposition system commercially available from Specialty Coating Systems. Various CVDP methods conventionally known to those skilled in the art may be implemented. In some embodiments, simultaneous pyrolysis and deposition may result in the disclosed PPX polymer films. In some non-limiting embodiments, a mixture of precursors may be placed in a sublimation chamber of CVDP equipment. A mixture of a substituted paracyclophane and a vinyl-functionalized paracyclophane may be introduced to CVDP equipment for deposition.

In accordance with one or more embodiments, a Parylene coating may be formed from a gaseous monomer. A Parylene coating may be formed without an intermediate liquid stage. A Parylene coating may be applied at ambient temperature with vacuum deposition equipment. The film may grow over time as Parylene polymer deposition occurs at a molecular level. A Parylene coating may generally be applied in a room temperature vacuum chamber via a vapor deposition polymerization process. Substrates to be coated may be placed into a coating chamber. A solid, granular dimer raw material may be heated under vacuum and vaporized into a dimeric gas. A mixture of a substituted paracyclophane and a vinyl-functionalized paracyclophane may be introduced to CVDP equipment as dimer. In some non-limiting embodiments, vaporization may be conducted at about 150° C. and about 1.0 torr. The gas may then be pyrolized to cleave the dimer to its monomeric form. In some non-limiting embodiments, pyrolysis may be conducted at about 680° C. and about 0.5 torr. The monomer gas may be deposited on a substrate as a polymer film in a deposition chamber at ambient temperature. The monomer may strike the surface of the desired substrate and spontaneously polymerize into a continuous film on the substrate. The film may be as thin or thick as desired based on an intended application and substantially transparent. In some embodiments, the thickness may range from hundreds of angstroms to several millimeters. In at least some embodiments, a typical thickness may be in the microns range.

Standard Parylene deposition process conditions, including temperature and pressure, may be implemented in accordance with one or more embodiments. In at least some embodiments, the CVDP equipment may include multiple heating zones. In accordance with one or more specific non-limiting embodiments, the CVDP process may be characterized by a pyrolysis temperature of about 500° C. The CVDP process may be characterized by a transport temperature of about 300° C. The CVDP process may be characterized by a deposition temperature of about 10° C. The CVDP process may be characterized by a sublimation temperature of about 125° C. Any one or more process temperatures or other process parameters may be controlled for process optimization. Strategic control of deposition temperature may beneficially result in less monomer residues and optimized cross-linking content.

In accordance with one or more embodiments, a chemically cross-linked PPX polymer film may be subjected to further treatment. Further treatment may generally involve application of one or more of temperature, UV illumination, e-beam cross-linking, and plasma conditioning. The mechanical properties of the elastic Parylene film may be further improved by an additional temperature treatment which may impact crystallinity, promote further cross-linking, and/or remove low molecular weight impurities. In some embodiments, crystallinity may be reduced via further thermal treatment, UV illumination, plasma conditions, and/or e-beam cross-linking. In some embodiments, the Parylene film may be annealed at a high temperature. For example, further thermal treatment may be characterized by application of an annealing temperature of about 100° C. to about 350° C., e.g. about 300° C. for about 1 to about 30 minutes, e.g. 5 minutes.

In accordance with one or more embodiments, one or more of the precursor materials may be synthesized. For example, the vinyl-functionalized paracyclophane may be synthesized.

In accordance with one or more embodiments, the chemically cross-linked PPX polymer film may have a vinyl content of about 5% or less. In some embodiments, the chemically cross-linked PPX polymer film may have a vinyl content of about 2.5% or less. For example, the chemically cross-linked PPX polymer film may have a vinyl content of about 0.5 to about 1.25%. In some specific embodiments, the cross-linked PPX polymer film may have a vinyl content of about 1%.

In accordance with one or more embodiments, an elastic Parylene film may be characterized by a low softening point, heightened solvent resistance and/or thermal dimensional stability. In some embodiments, the PPX film may be characterized by an enhanced resistance to solvents, e.g. organic solvents, e.g. THF or chloroform. In at least some embodiments, the PPX film may be characterized by thermal dimensional stability up to at least about 350° C.

In accordance with one or more embodiments, the PPX film is substantially insoluble.

In accordance with one or more embodiments, the PPX film may have a low glass transition temperature.

In accordance with one or more embodiments, the PPX film may have a Young's modulus of between about 0.01 GPa and about 0.05 GPa. In some non-limiting embodiments, the PPX film may have a Young's modulus of between about 0.02 GPa and about 0.04 GPa.

In accordance with one or more embodiments, the PPX film may be characterized by an elongation at break value of up to about 100%, 150%, 200%, 300%, or 350%. The PPX film may be characterized by a cyclic strain test value of at least about 100% elongation per cycle. The PPX film may not exhibit any significant damage following the cyclic strain test but may also not recover to its original shape. The PPX film may be characterized by a cyclic strain test shape shift value of between about 20 and 30%.

In accordance with one or more embodiments, the Parylene coating may be a thin-film coating. The coating may be continuous and substantially uniform across a substrate. In some non-limiting embodiments, a Parylene coating in a controlled thickness down to at least about several thousand angstroms may be achieved. A Parylene coating in a controlled thickness up to at least about several millimeters may also be achieved. The thickness can generally be controlled to at least about plus or minus 10%. In some non-limiting embodiments, the PPX film may have a thickness of greater than about 0.5 µm.

The Parylene coating may be conformal with respect to surfaces, edges and crevices of a substrate and may be substantially pinhole-free. Multi-layer penetration may be achieved. In some embodiments, a Parylene coating may add minimal dimension or mass to critical, weight-sensitive components. Parylene coatings may be optically clear, or incorporated with an indicator compound, such as a fluorescent, to facilitate identification. Parylene coatings may be associated with a favorable water vapor transition rate.

In some embodiments, a Parylene coating may be substantially biostable and biocompatible. The coatings may comply with biological testing requirements for ISO-10993. The coatings may comply with the biological testing requirements for USP Class VI plastics. The coatings may promote proliferation of human cell types. In some embodiments, a Parylene coating may exhibit barrier properties, such as may protect a substrate from fluids, moisture, chemicals and common gases. Protection from biofluids and biogases may be provided. A Parylene coating may exhibit a high dielectric strength and/or may impart dry-film lubricity to a substrate. Parylene coatings may protect against corrosion, discoloration and contaminant entrapment. Parylene coatings may serve as dielectric barriers. In some embodiments, a Parylene coating may be flexible, deter surface tackiness, and reduce the coefficient of friction. The Parylene coating may have various favorable coefficients of friction as measured by ASTM D 1894 for static observations. In some embodiments, a Parylene coating may exhibit thermal and/or UV stability.

In accordance with one or more embodiments, a Parylene coating may be applied to a substrate. Adhesion promotion technologies may be used in conjunction with the deposition methods. The substrate may generally be any material, device or component to which it may be desirable to apply a coating, such as a barrier or functional layer. A Parylene coating may be applied to virtually any surface material, including metals, elastomers, plastics, glasses, ceramics and papers. Parylene coatings may find applications in various industries including medical devices, electronics, automotive, military, aerospace, LEDs, and elastomers.

In some embodiments, the substrate may be a flexible substrate. In some non-limiting embodiments, the flexible substrate may pertain to a printed circuit board (PCB) or a medical device.

In some embodiments, the substrate may be associated with electronics, printed circuit boards, printed circuit assemblies, sensors, detectors, LEDs, MEMS, capacitors, wafers, ferrite cores, fuel cells, digital displays, metal components. In other embodiments, the substrate may be a gasket or seal. In still other embodiments, the substrate may be a medical device. The substrate may be pre-treated prior to Parylene deposition. Fixturing and masking techniques may be used to minimize contact points and avoid coating of areas to remain uncoated.

In accordance with one or more embodiments, a Parylene coating may be applied to an implantable or nonimplantable medical device. A medical device, such as but not limited to, a heart valve, coronary stent, cerebral stent, cardiac assist device including defibrillators and pacemakers, electrosurgical tool, cochlear implant, ocular implant, mandrel, mold, catheter, elastomeric seal, needle, epidural probe, artificial joint, disc, screw, other orthopedic implement, or medical electronics, e.g. flexible medical electronics, may be coated with Parylene. Parylene coatings may also be used as release agents for molds and forming devices, such as wire mandrels. The Parylene coating may provide an acceptable surface for tissue contact and may protect the medical device and associated components. In some embodiments, a Parylene coating may function as a surface primer, such as on a drug-eluting stent where a drug-containing copolymer is applied to a Parylene coated metal coronary stent for human implantation. The Parylene coating may enable integration of various drug and polymer combinations.

In at least some embodiments, the elastic Parylene coating is halogen free or substantially halogen free. For example, disclosed elastic Parylene coatings may be characterized as being chlorine free.

In accordance with one or more embodiments, elastic Parylene coatings with antimicrobial properties may be provided. In some embodiments, methods may introduce materials with antimicrobial properties into Parylene films during a Parylene deposition process. In accordance with one or more embodiments, a coating may comprise a Parylene material and an antimicrobial agent immobilized on the Parylene material.

The function and advantages of these and other embodiments will be more fully understood from the following non-limiting example. The example is intended to be illustrative in nature and is not to be considered as limiting the scope of the embodiments discussed herein.

EXAMPLE

Simultaneous pyrolysis and deposition of 4-vinyl[2.2] paracyclophane and 4,12-dibutyl[2.2]paracyclophane was used to synthesize a set of crosslinked PPX copolymers, each with a varying content of vinyl between 0 and 2.5%.

A comparison of IR spectra did not show any major differences. TGA measurements of the copolymers also varied only slightly. All copolymers exhibited a first degradation step at around 200° C. and a second major step where the polymers degrade at around 465° C.

Comparison of elongation at break values showed a maximum of 195% for the copolymer with a vinyl content of 1%. Only the copolymer with 1.25% vinyl achieved comparable values with 190%. The lowest elongation was received for the copolymer with 2.5% vinyl moieties. The determined Young moduli of all samples were low with values between 0.025 and 0.037 GPa but no trend between the vinyl content and the Young moduli was observable. The cyclic strain tests exhibited for all samples a shape shift between 25 and 30% after the first elongation. In the following cycles the shape maintained almost the same.

FIG. 1 presents a graphical summary of elongations at break values and Young Moduli of the PPX butyl copolymers with vinyl contents between 0% and 2.5%.

The as-deposited samples exhibited unreacted vinyl groups and low molecular weight compounds. These low weight compounds were considered to act as plasticizer. The semi crystalline copolymers were then treated thermally to increase the crosslinking density and to lower their crystallinity. Specifically, the PPX butyl copolymers were annealed in vacuum for 5 minutes at 350° C. Besides the postdeposition crosslinking this treatment led to the removal of the low molecular weight compounds and a decrease of the crystallinity.

In response, stiffer copolymers were obtained so that the elongation at break values and Young moduli increased. The insoluble copolymers exhibited elongation at break values up to 340% (copolymer with a vinyl content of 1%). Cyclic strain tests showed that the repeated elongation to 100% did not cause major damages at the samples. The initial shape of the samples was affected by the cyclic strain so that an extension was maintained.

Figure 2:
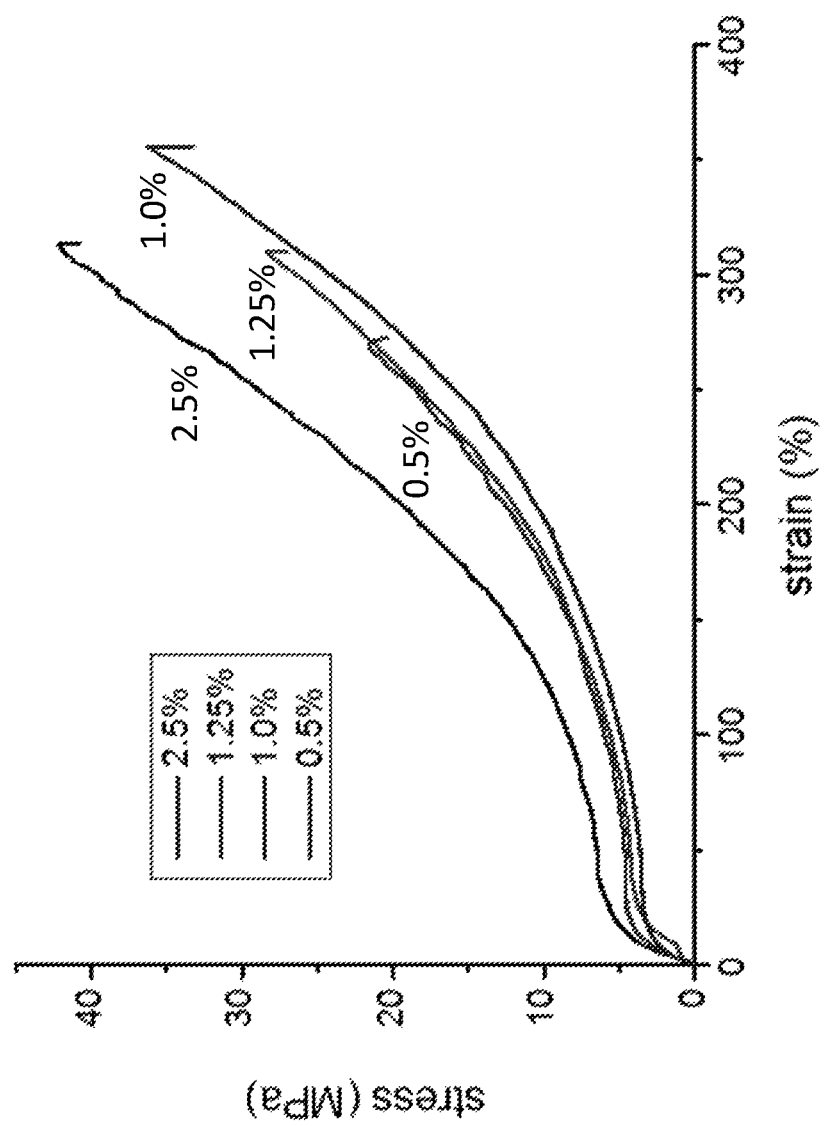

FIG. 2 presents a graphical summary of elongation at break measurements of the PPX butyl copolymers with vinyl contents between 0% and 2.5% after the annealing step. Table 1 (below) provides a summary of the mechanical properties of the PPX butyl copolymers with vinyl contents between 0% and 2.5% after the annealing step.

TABLE 1

Summary of mechanical properties after annealing

| vinyl content (%) | elongation at break (%) | Young modulus (GPa) | remaining elongation after $1^{st}$ cycle (%) |
|---|---|---|---|
| 2.5 | 276 | 0.054 | 45 |
| 1.25 | 306 | 0.046 | 44 |
| 1.0 | 340 | 0.035 | 48 |
| 0.5 | 324 | 0.047 | 48 |

The improved stability was further demonstrated by coating and expansion of stents. A copolymer coating with a vinyl content of 1% was chosen and after further temperature treatment the coated stent was expanded and compressed three times. For comparison another stent was coated with PPX-C and treated three times as well. Coatings on stents showed the stability of the copolymer after expansion in comparison to PPX-C.

SEM images of the two stents exhibited a smoother surface observable for the PPX butyl copolymer coating. At the junctions of the stent the PPX-C layer showed damage through the mechanical stress so that the metal surface of the stent appeared. These damages could not be observed at the copolymer coated stent so that the risk of cell adhesion is minimized with this coating.

The results indicate chemically crosslinked PPX polymers as promising coating material for demanding applications.

Those skilled in the art would readily appreciate that the various parameters and configurations described herein are meant to be exemplary and that actual parameters and configurations will depend upon the specific application for which the present disclosure are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, the disclosed coatings and deposition methods may be practiced otherwise than as specifically described. The present coatings and techniques are directed to each individual feature or method described herein. In addition, any combination of two or more such features, apparatus or methods, if such features, apparatus or methods are not mutually inconsistent, is included within the scope of the present disclosure.

While exemplary embodiments of the disclosure have been disclosed many modifications, additions, and deletions may be made therein without departing from the spirit and scope of the disclosure and its equivalents, as set forth in the following claims. It is to be appreciated that various alterations, modifications, and improvements will readily occur to those skilled in the art. Such alterations, modifications, and improvements are intended to be part of this disclosure, and are intended to be within the spirit and scope of the disclosure. For example, an existing coating, deposition equipment or deposition method may be modified to utilize or incorporate any one or more aspects of the disclosure. Thus, in some cases, embodiments may involve configuring existing processes or equipment to provide elasticity. Accordingly, the foregoing description and is by way of example only.

What is claimed is:

1. A chemically cross-linked elastic Parylene or poly (para-xylylene) (PPX) polymer film having a Young's modulus of between about 0.01 GPa and about 0.05 GPa.

2. The Parylene polymer film of claim 1, wherein a vinyl content of the polymer film is about 5% or less.

3. The Parylene polymer film of claim 2, wherein a vinyl content of the polymer film is about 2.5% or less.

4. The Parylene polymer film of claim 1, wherein the polymer film has thermal dimensional stability up to at least about 350° C.

5. The Parylene polymer film of any of claim 1, wherein the polymer film has an elongation at break value of up to about 350%.

6. The Parylene polymer film of claim 1, wherein the polymer film is treated with UV, plasma, e-beam cross-linking, or temperature.

7. The Parylene polymer film of claim 1, wherein the polymer film has a thickness of greater than about 0.5 µm.

8. A chemically cross-linked elastic Parylene or poly (para-xylylene) (PPX) polymer film prepared by steps of:
   mixing a substituted paracyclophane and a vinyl-functionalized paracyclophane to form a mixture; and
   co-polymerizing the mixture via a chemical vapor deposition polymerization (CVDP) process on a substrate to form the chemically cross-linked elastic polymer film.

9. A device, comprising:
   a flexible substrate coated with the Parylene polymer film of claim 1.

10. The device of claim 9, wherein the flexible substrate pertains to a printed circuit board (PCB) or to a medical device.

* * * * *